(12) United States Patent
Wibbeke et al.

(10) Patent No.: US 12,479,012 B2
(45) Date of Patent: Nov. 25, 2025

(54) METHOD FOR COOLING AND/OR SEPARATING ADHESIVELY BONDED COMPONENTS AND/OR REMOVING ADHESIVE RESIDUES FROM SURFACES AND JET APPARATUS HEREFOR

(71) Applicant: Mycon GmbH, Bielefeld (DE)

(72) Inventors: Michael Wibbeke, Paderborn (DE); Gerson Meschut, Bielefeld (DE); Marc Wuensche, Detmold (DE); Jan Ditter, Paderborn (DE); Jens-Werner Kipp, Bielefeld (DE)

(73) Assignee: Mycon GmbH, Bielefeld (DE)

( * ) Notice: Subject to any disclaimer, the term of this patent is extended or adjusted under 35 U.S.C. 154(b) by 100 days.

(21) Appl. No.: 18/011,874

(22) PCT Filed: Jun. 22, 2021

(86) PCT No.: PCT/DE2021/100531
§ 371 (c)(1),
(2) Date: Dec. 21, 2022

(87) PCT Pub. No.: WO2021/259424
PCT Pub. Date: Dec. 30, 2021

(65) Prior Publication Data
US 2023/0241651 A1    Aug. 3, 2023

(30) Foreign Application Priority Data

Jun. 22, 2020  (DE) .................... 10 2020 003 736.4
Aug. 20, 2020  (DE) .................... 10 2020 005 120.0
(Continued)

(51) Int. Cl.
*B05B 7/14*    (2006.01)
*B05B 12/16*   (2018.01)
(Continued)

(52) U.S. Cl.
CPC ............. *B08B 7/0021* (2013.01); *B05B 7/14* (2013.01); *B05B 12/16* (2018.02); *B08B 7/0092* (2013.01);
(Continued)

(58) Field of Classification Search
CPC .... B05B 1/00; B05B 1/28; B05B 7/00; B05B 7/0075; B05B 7/025; B05B 7/04;
(Continued)

(56) References Cited

U.S. PATENT DOCUMENTS 3,676,963 A   7/1972   Rice et al.
5,405,283 A   4/1995   Goenka
(Continued)

FOREIGN PATENT DOCUMENTS

DE   41 28 751 A1    3/1993
DE   101 28 413 C1   12/2002
(Continued)

OTHER PUBLICATIONS

International Search Report in PCT/DE2021/100531, dated Oct. 25, 2021.

*Primary Examiner* — Michael A Tolin
(74) *Attorney, Agent, or Firm* — Collard & Roe, P.C.

(57) ABSTRACT

In a cleaning method for removing adhesive residues from surfaces, in particular after separating an adhesive connection between adhesively joined partners, liquid carbon dioxide from a reservoir enters a jet apparatus and is guided there through a first dosing unit into an expansion chamber, wherein a cold-resistant liquid is then supplied to a mixture created in the expansion chamber from gaseous carbon dioxide and carbon dioxide particles and wherein the mixture, to which the cold-resistant liquid has been added, exits the jet apparatus via an outlet opening thereof. Furthermore, a jet apparatus removes adhesive residues from surfaces.

8 Claims, 9 Drawing Sheets

(30) Foreign Application Priority Data

Oct. 8, 2020 (DE) .................. 10 2020 126 452.6
Apr. 22, 2021 (DE) .................. 10 2021 110 364.9

(51) Int. Cl.

| | |
|---|---|
| *B08B 7/00* | (2006.01) |
| *B08B 7/04* | (2006.01) |
| *B24C 1/00* | (2006.01) |
| *B24C 5/02* | (2006.01) |
| *B24C 9/00* | (2006.01) |
| *B32B 43/00* | (2006.01) |
| *B60S 5/00* | (2006.01) |
| *B62D 67/00* | (2006.01) |
| *C11D 7/50* | (2006.01) |

(52) U.S. Cl.
CPC .............. *B08B 7/04* (2013.01); *B24C 1/003* (2013.01); *B24C 5/02* (2013.01); *B24C 9/00* (2013.01); *B32B 43/006* (2013.01); *B60S 5/00* (2013.01); *B62D 67/00* (2013.01); *C11D 7/5022* (2013.01); *B08B 2220/01* (2013.01); *C09J 2301/502* (2020.08)

(58) Field of Classification Search
CPC ....... B05B 7/0416; B05B 7/0483; B05B 7/12; B05B 7/14; B05B 7/1413; B05B 7/1418; B05B 7/1431; B05B 7/16; B05B 7/1686; B05B 7/24; B05B 7/2402; B05B 7/2464; B08B 7/0021; B08B 7/0092; B08B 7/04; B08B 15/04; B08B 2220/01; B08B 2220/04; B24C 1/003; B24C 1/04; B24C 5/02; B24C 5/04; B24C 7/00; B24C 7/0084; B24C 9/00; B24C 9/003; B24C 11/00; B24C 11/005; B32B 43/006; B60S 5/00; B62D 27/026; B62D 67/00; C09J 2301/502; F16B 11/006; Y10T 156/11; Y10T 156/1153; Y10T 156/1168; Y10T 156/1179; Y10T 156/19; Y10T 156/1911; Y10T 156/1961

See application file for complete search history.

(56) References Cited

U.S. PATENT DOCUMENTS

| | | | |
|---|---|---|---|
| 2003/0207655 A1* | 11/2003 | Jackson | .................. B08B 6/00 451/38 |
| 2008/0257382 A1* | 10/2008 | Steven | ................. C11D 7/5004 134/6 |
| 2011/0259971 A1* | 10/2011 | Askin | ................... B24C 1/003 239/432 |
| 2016/0332282 A1 | 11/2016 | Bigot et al. | |
| 2018/0222013 A1 | 8/2018 | Held et al. | |

FOREIGN PATENT DOCUMENTS

| | | |
|---|---|---|
| DE | 20308788 U1 | 8/2003 |
| DE | 10 2008 061 667 A1 | 6/2010 |
| EP | 2 306 467 A1 | 4/2011 |
| EP | 3 459 474 A1 | 3/2019 |
| WO | 00/00326 A1 | 1/2000 |
| WO | 2012/089359 A1 | 7/2012 |

* cited by examiner

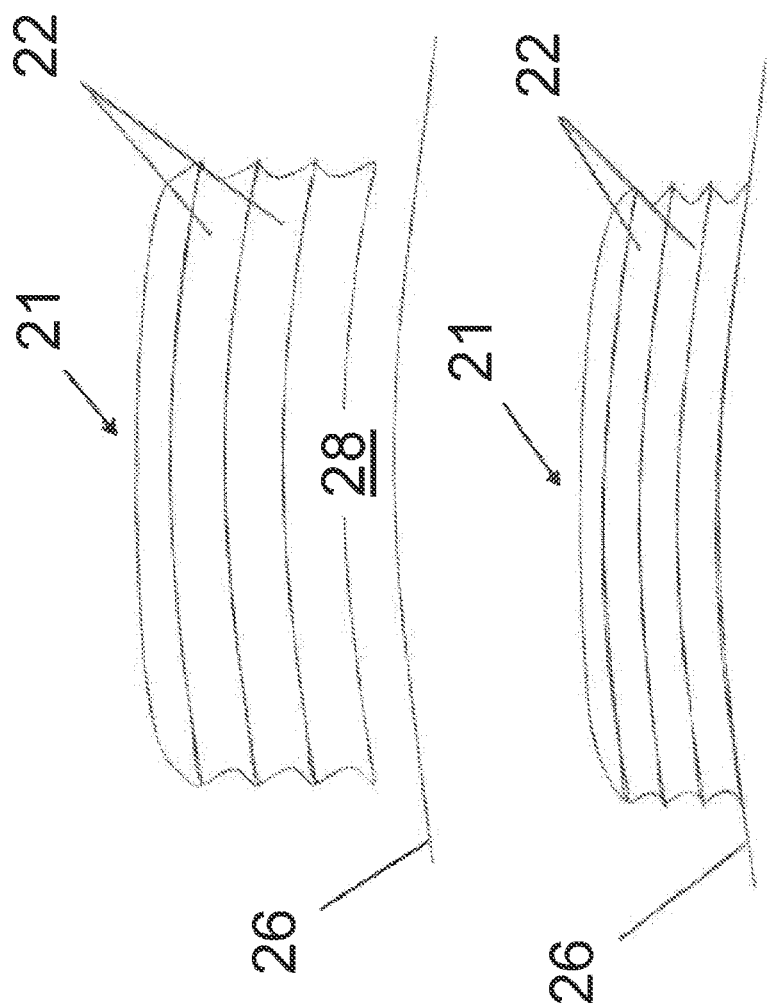

METHOD FOR COOLING AND/OR SEPARATING ADHESIVELY BONDED COMPONENTS AND/OR REMOVING ADHESIVE RESIDUES FROM SURFACES AND JET APPARATUS HEREFOR

CROSS REFERENCE TO RELATED APPLICATIONS

This application is the National Stage of PCT/DE2021/100531 filed on Jun. 22, 2021, which claims priority under 35 U.S.C. § 119 of German Application Nos. 10 2020 003 736.4 filed on Jun. 22, 2020 and 10 2020 005 120.0 filed on Aug. 20, 2020, the disclosures of which are incorporated by reference. The international application under PCT article 21(2) was not published in English.

BACKGROUND OF THE INVENTION

1. Field of the Invention

The invention relates to a method for removing adhesive residues from surfaces and a jet device herefor.

2. Description of the Related Art

Adhesive connections are increasingly used, materially bonded joints between joint partners, which have to be separated again, for example, in the automotive sector, for example during maintenance work or in the course of body repairs, but also if necessary. Existing connections and joining points must be opened or removed economically and efficiently for this purpose. The removal of structural adhesive connections in particular represents a major challenge. Since more and more not only subordinate components, but also load-bearing components or components which determine the load on the overall structure, are adhesively bonded together, there are more and larger adhesive surfaces that have to be separated again if necessary. The adhesives are also becoming more and more resilient, which naturally causes additional problems during separation.

So-called impact-modified adhesives are often used for bonding, which have epoxy resins strengthened by elastic particles, which have both high strength and enable high-energy absorption. A removal process therefore requires an increased expenditure of force at room temperature.

A common procedure today for separating adhesive bonds is local heating of the bonded areas using various methods (hot air blowers, infrared heaters, etc.) in order to soften the adhesive layer. However, the heating is often undefined and there is a risk of thermal damage to adjacent, remaining structures, components and surfaces.

This can make re-bonding more difficult. For example, when heating of an adhesive area on a motor vehicle with hot air, the adhesive can be softened and thus detached more easily, but adjacent, for example painted bodywork areas that remain on the vehicle can also be overheated and thus their color or strength change or even be irreparably damaged by blistering.

The use of hot-thermal methods, for example using an induction heater or a hot-air blower, is known for breaking the adhesive connections of parts or for cleaning contaminated surfaces on the parts. It is necessary to work in high temperature ranges of up to 400° C., so that the functionality of the connected parts or deeper layers can be impaired.

Furthermore, cleaning methods and jet devices are known that work with the help of carbon dioxide and optionally additionally used compressed air. The carbon dioxide is supplied either in solid form as pellets or as liquid carbon dioxide. It then expands in an expansion chamber of the jet device or upon exiting a nozzle of the jet device in the atmosphere to form small carbon dioxide particles and gaseous carbon dioxide.

For example, such a jet device and a cleaning method are described in DE 10 2008 061 667 A1.

From DE 101 28 413 C1 it is known that an adhesive connection of body components can be released by cold embrittlement of the adhesive with the aid of a coolant applied to the area and subsequent mechanical separation. The coolant, here preferably liquid nitrogen, is applied to the adhesive areas to be separated either by immersing these adhesive areas in a coolant bath or by spraying the coolant onto the adhesive area. Alternatively, a so-called cold pack made of a deformable material can also be placed on the adhesive areas to be separated, through which the actual coolant circulates. A disadvantage of this solution is the complex application of the coolant to the adhesive area, which requires either extensive preparations or a large amount of coolant in the form of a coolant bath for immersing the adhesive area. This procedure is particularly unsuitable for an occasional separation of adhesive area, the consumption or the necessary supply of coolant is also considerable and separating the adhesive areas is therefore expensive. In addition, the use of liquid nitrogen is problematic for reasons of occupational safety law, and the cooling by the liquid nitrogen may also be too strong.

DE 41 28 751 A1 has become known for the separation of materials to be recycled, such as stainless steel and bitumen insulation on household appliances, to use liquid carbon dioxide to generate cold in the adhesive layer in order to bring the adhesive joint partners into a freezer to an adhesive temperature of up to −30° C. and thereby make the adhesive brittle. Here, too, special systems are needed that are only suitable for separating processes with corresponding quantities of components to be separated.

With the known methods, surfaces can only be cooled to temperatures of about −40° C. within a long, hardly acceptable process time using carbon dioxide. The transferable cooling capacity is limited in particular by the comparatively low energy content of the gaseous carbon dioxide.

SUMMARY OF THE INVENTION

The object of the invention is to remove adhesive residues from a surface by means of an improved cleaning method or a further developed jet device.

The invention has the features of the independent claims in order to achieve the object. The further dependent claims and the following description show advantageous developments of the invention.

The invention has recognized that effective cleaning can be achieved by increasing the energy transfer and further cooling the surface to be cleaned if a cold-resistant liquid is admixed to the cleaning jet. The cold-resistant liquid is admixed before, during or after the conversion of the liquid carbon dioxide into gaseous carbon dioxide and carbon dioxide particles. The coolant formed by admixing the cold-resistant liquid to the carbon dioxide has a significantly higher energy content and temperatures below −40° C. and preferably about −70° C. can be brought about. At such low temperatures, the cleaning effect improves. For example, adhesives used in the automotive industry in body construction become brittle at these temperatures. In the brittle state, adhesive residues can be removed quickly and reliably.

Adhesives in particular become brittle at these temperatures. In the embrittled state, the adhesive areas can be dismantled and preferably separated mechanically. The contamination can then be removed from the surfaces quickly and reliably.

Ethanol or isopropanol, for example, is added to the carbon dioxide mixture as a cold-resistant liquid, or a mixture with ethanol or isopropanol as the main component is used.

The temperature of solid carbon dioxide is −78.5° C. The temperature of the exiting mixture is reduced by adding a cold-stable liquid and a slightly warming up in the area of the nozzle and in the atmosphere before it hits the surface of the adhesive parts to be separated or the contaminated surface. However, temperatures of up to around −70° C. can be reached here. This temperature is particularly dependent on the amount of carbon dioxide supplied in relation to the amount of cold-stable liquid supplied.

When using the refrigeration process, significant amounts of gaseous carbon dioxide and also combustible liquid are released. That entails dangers for occupational safety. It is therefore expedient to collect the released carbon dioxide and the released liquid in a housing adjoining the nozzle outlet, insofar as this is possible with regard to the surface geometry. The housing is open to the surface of the part to be separated or cleaned, but also has an opening to which a line for removing carbon dioxide and cold-stable liquid is connected. Due to the inherent pressure of the gas, sufficient evacuation then occurs either automatically or this evacuation can be supported by gentle suction.

Instead of liquid carbon dioxide, all liquid gases can be used that reach a temperature below −40° C. when expanded into the gaseous state. For example, liquid nitrogen can be used. Ethanol, isopropanol or another cold-resistant liquid can then also be added to the nitrogen. Significantly lower temperatures can then be achieved here. However, nitrogen is more difficult to handle and provides far higher requirements for safety reasons. It could be used in stationary applications, for example in the car factory, for example when repairing a failed production or removing excess glue.

The cold-resistant liquid is preferably fed into the jet device during or after the expansion of the liquid gas, preferably carbon dioxide. The cold-resistant liquid is therefore not added to the liquid carbon dioxide, but rather to the mixture of gaseous carbon dioxide and carbon dioxide particles that is being formed or has been formed.

The liquid carbon dioxide and the cold-resistant liquid are dosed at the jet device by separate dosing units. This makes it possible to flexibly adapt the mixing ratio and the volume flow to different cleaning tasks.

The shape and size of the expansion chamber and the setting of the dosing unit for the liquid carbon dioxide are preferably chosen so that the liquid carbon dioxide converts to about 40 to 60% into gas and correspondingly about 60% up to 40% carbon dioxide particles. A particularly effective cleaning and cooling has been demonstrated here and the cleaning process can advantageously be carried out quickly.

This process can also be used as an effective energy transfer system, for example for cooling systems using two different media. The admixing of the cold-stable liquid before, during or directly after the expansion of the liquid carbon dioxide leads to a higher energy density in the expansion space. This accelerates the transfer of energy. This leads to a stronger cooling of the environment. Due to the higher heat transfer coefficient of the cold-stable liquid, faster and more energy is extracted from the adjacent surfaces at the same time.

The invention is based on a device for separating adhesive connections that is gentle on the component, which brings a coolant into the area of the adhesive connections to be separated between adhesive joint partners, as a result of which the adhesive of the adhesive connection assumes a temperature that enables the adhesive connection to be separated with low mechanical forces. The device is further developed according to the invention in that a cooling head covers at least a section of the adhesive joint to be separated, the coolant being able to be introduced between the cooling head and the section of the adhesive joint covered by the cooling head. An advantage of this embodiment of the device according to the invention is the limitation of the required volume of coolant and the targeted application of the coolant only to the areas of the adhesive connection that are to be separated from one another. In an advantageous embodiment, the cooling head can be adapted and dimensioned to the particular shape of the sections of the adhesive connection covered by the cooling head and in each case covers at least the region of the adhesive connection that is to be separated from one another. As a result, the volume of coolant to be introduced is largely reduced to the volume of the cooling head, and the cooling head can also largely seal off the coolant to be introduced against unwanted escape and thus loss of coolant. In addition, the cooling head can seal off adjacent areas of the components that are not to be cooled from the undesired effects of cold. For example, the cooling head can be positioned manually at the adhesive joint and consumes—unlike the well-known coolant baths for immersing the components—significantly less coolant. In addition, handling is much easier and safer.

It is of particular advantage if the basic shape of the cooling head is adapted, preferably by means of additive manufacturing processes, to the respective shape and/or geometry of the adhesive joint partners in the region of the adhesive connection to be separated. As a result, the basic shape of the cooling head can also be adapted easily and inexpensively, especially when using additive manufacturing processes, to a wide variety of shapes and, if necessary, part geometries as well as the dimensions of the adhesive connections to be separated from the adhesive joining partners, so that the advantages of the limited coolant volume required and good handling are achieved of the cooling head can be guaranteed even with complex geometric conditions of the adhesive connection to be separated.

It is advantageous here if the cooling head has a hood-shaped, preferably bellows-like basic shape, since such a hood-shaped design of the cooling head offers good handling of the cooling head with a defined volume for the coolant inside the cooling head. The hood-shaped cooling head is then designed to match the respective shape of the adhesive joint partners in the area of the respective adhesive joint to be separated and can be pressed against the respective area of the adhesive joint to be cooled, so that the cooling head overlaps the respective area of the adhesive joint to be cooled and largely closes it off in relation to the environment. The introduced coolant is thereby largely enclosed and can develop its cooling effect locally without coolant being able to escape inadmissibly. A hood-like gripping is to be understood here as meaning any form of delimitation of a largely closed volume between the cooling head and the adhesive joining partners, which naturally depends on the shape of the adhesive joining partners to be separated and the necessary coolant volume and, within the scope of this invention, can be largely adapted to the respective conditions by a person skilled in the art.

In a further embodiment, the cooling head can have a material which, at normal ambient temperature, can be elastically deformed and adapted to the shape of the adhesive joint contour in the area of the respective covered adhesive connection, with the material of the cooling head retaining its respective shape when the adhesive connection cools down, preferably inelastically solidified. In addition to or in addition to a structural adaptation of the basic shape of the cooling head to the shape of the area of the adhesive joint to be cooled, the material of the cooling head can also be designed at least in sections in such a way that the cooling head is fully or partially elastically deformable and thus additionally adapts to the shape of the cooled area of the adhesive joint. This elastic deformability is advantageous when building up the cooling effect, since it improves the sealing of the coolant volume in the cooling head. However, if the cooling effect is to be maintained for a longer time, the handling of the cooling head is simplified if the elastically deformable parts of the cooling head lose at least part of their elasticity and largely lose it due to the coldness of the coolant inside the cooling head and solidify, which also acts on the elastically deformable parts and thereby retain the shape achieved. As a result, the contact forces required for sealing, for example, on the cooling head can be reduced.

A further improvement in the loss of coolant can be achieved in that the cooling head has sealing elements or the like, preferably sealing lips, on its joining region which is in contact with the adhesive joining partners. In this way, an elasticity that can be adjusted independently of the existing elastic properties of the cooling head itself is possible at the contact areas between the cooling head and the respective covered areas of the adhesive connection, as a result of which the sealing effect can be additionally improved. Remaining joints between the contact areas of the cooling head and the adhesive joint partners are also sealed by the effect of the coolant that may escape there, in that areas iced up with the ambient air are formed there, which additionally close the joints. For example, when using liquid carbon dioxide, which changes to a gaseous state in the area of the cooling head, dry ice forms on the bonded joint to be separated as a result of resublimation, which also seals the remaining joints.

It is of particular advantage for the handling of the device that the cooling head partially cools the entire adhesive joint to be separated by successive displacement relative to the adhesive joint partners and the adhesive connection can be partially separated one after the other. As a result, even larger adhesive connection surfaces can be processed one after the other without large quantities of coolant are required for this. In this case, the cooling head is moved, for example by hand, successively or in steps over the adhesive surfaces to be separated and cooled in each case, after which the respective cooled area is mechanically separated.

For manual handling of the device in particular, it is advantageous if the cooling head, preferably insulated from other areas of the cooling head in terms of refrigeration technology, has handling elements, preferably at least one handle or the like, with which the cooling head can be pressed against the adhesive joining partners. This allows, for example, a worker to manually position the cooling head to match the adhesive joint to be separated and cool it locally and then separate it, after which the worker positions the cold head at the next point on the adhesive joint to be separated and can thus successively process larger adhesive joints to be separated. Handling elements of this type also make it easier to press on and seal off the cooling head, if necessary until the material of the cooling head has solidified. It is of course also conceivable for the cooling head to be positioned automatically or in a guided manner.

Furthermore, it is conceivable that the cooling head has a separating device with which the adhesive joining partners can be separated by applying a mechanical force, preferably a force introduced in a pulsed manner, in the area of the cooled adhesive surface. Such a separating device arranged on the cooling head can, for example, bring about at least local separation of the adhesively joined parts by mechanical impacts and/or vibration on the adhesively joined parts and thereby accelerate the separation of the adhesively joined parts.

Furthermore, it is advantageous if the device has means for introducing a gaseous coolant or a coolant that changes into the gaseous state between the cooling head and the section of the adhesive connection covered by the cooling head. For this purpose, corresponding valves and supply lines can be arranged on the cooling head, which, for example, connect the cooling head to a coolant reservoir, through which the coolant can enter the interior of the cooling head from the coolant reservoir. It is also conceivable to design these connections in such a way that the cooling head is connected to the coolant reservoir in a fluid-tight manner in such a way that the coolant can circulate between the cooling head and the coolant reservoir. By this also a recovery of the coolant is possible after the respective cooling cycle per area of the adhesive joint to be separated has ended.

Furthermore, for monitoring the cooling process, it is conceivable for a monitoring device to be provided in the area of the cooling head for the temperatures reached in the cooling head and/or on the bonded joining partners. For example, the volume inside the cooling head can be monitored by a temperature sensor, or the surface temperature of the adhesively joined parts can be measured inside the cooling head.

In a conceivable embodiment, the material of the cooling head can have, at least in sections, for example elastomeric plastic materials with a glass transition range between $-50°$ C. and $-78°$ C., preferably silicone rubber and/or styrene-butadiene rubber and/or polybutadiene. On the one hand, such materials are easily elastically deformable at room temperature and can be easily brought into the required shape of the cooling head, on the other hand, they tend to have brittle properties below their respective glass transition temperature. The glass transition temperature of such materials is advantageously located in the range of temperatures generated by the coolant within the cooling head, so that the coolant can cause not only embrittlement of the adhesive connection but also solidification of such materials in the cooling head.

Alternatively, it is also conceivable for the material of the cooling head to have metallic materials, at least in sections, which are shaped in the form of a bellows or similar to corrugated pipes or flexible hoses. Although metallic materials of this type do not harden as much as plastic materials at normal coolant temperatures, they are sufficiently flexible and suffer less mechanical wear than plastic materials.

It is also conceivable to use deep-frozen liquid gases, preferably liquid carbon dioxide $CO_2$ or liquid nitrogen, as coolants, which evaporate in the cooling head and produce a strong cooling effect. The liquid carbon dioxide is easier and less dangerous to handle. Of course, other cooling gases can also be used with the device according to the invention. The use of the cold head as part of the device according to the invention is optional and dependent on the application. In particular, the use of a cooling head in the series offers itself for recurring removal or cleaning processes, whereas the use of a cooling head that is in any case individually adapted to the geometry of the components is less advantageous for small quantities. Here the jet device can be used flexibly without a cooling head.

It can optionally be provided that the jet device has a collecting head for the coolant made from the carbon dioxide and the low-temperature-resistant liquid, with which the supplied coolant is collected or sucked up. The jet device can be used, for example, if the cooling head is not used.

The method according to the invention for separating adhesive connections and/or removing adhesive residues from surfaces in a component-friendly manner provides, for example, that the coolant is brought into the area of the surfaces of the adhesive connections to be separated between adhesively joined partners, whereby the adhesive of the adhesive connection assumes a temperature that a separation of the adhesive connection is possible with lower mechanical forces. In this case, a cooling head is advantageously adapted to the geometry of the adhesive joint partners in the area of the adhesive connection to be separated. The cooling head covers at least one section of the bonded connection to be separated, with the coolant being introduced between the cold head and the section of the adhesive connection covered by the cold head.

BRIEF DESCRIPTION OF THE DRAWINGS

Exemplary embodiments of the invention are explained in more detail below with reference to drawings. Features mentioned there and in the claims can each be essential to the invention individually or in any combination. Features and details of the jet device described according to the invention naturally also apply in connection with the cleaning method according to the invention and vice versa. Thus, mutual reference can always be made to the disclosure on the individual aspects of the invention.

The drawings serve only as examples to clarify the invention and have no restrictive character.

The drawings show:

Figure 1:
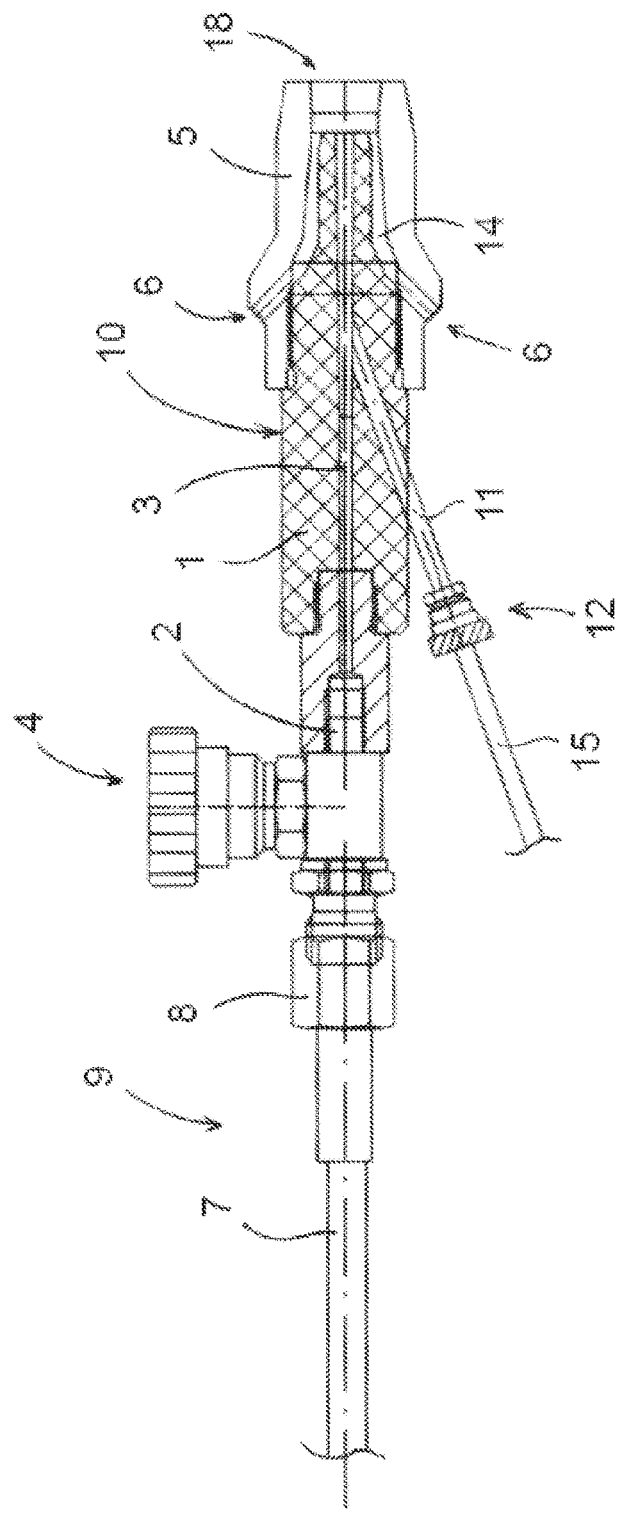
Figure 2:
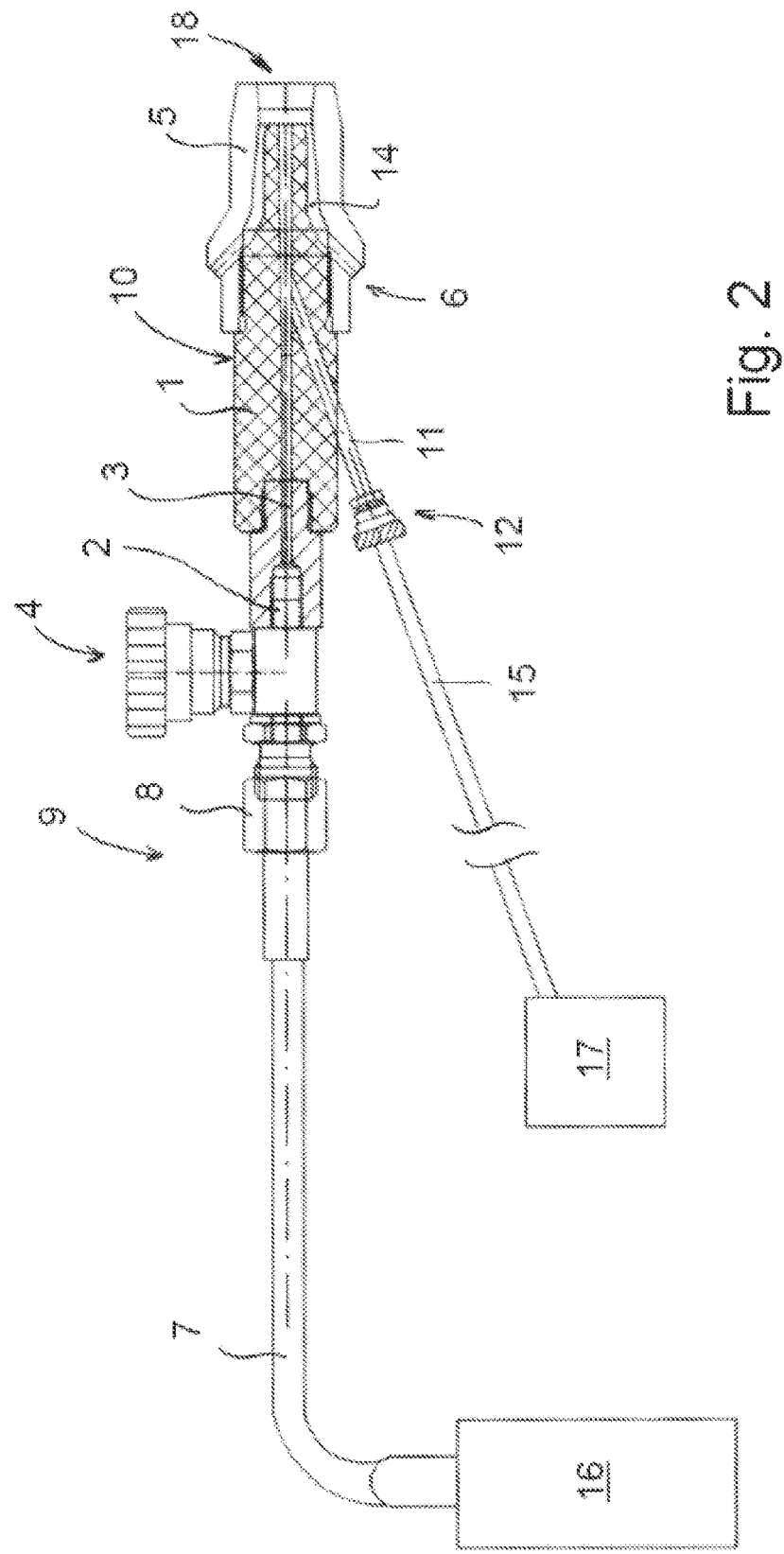
Figure 3:
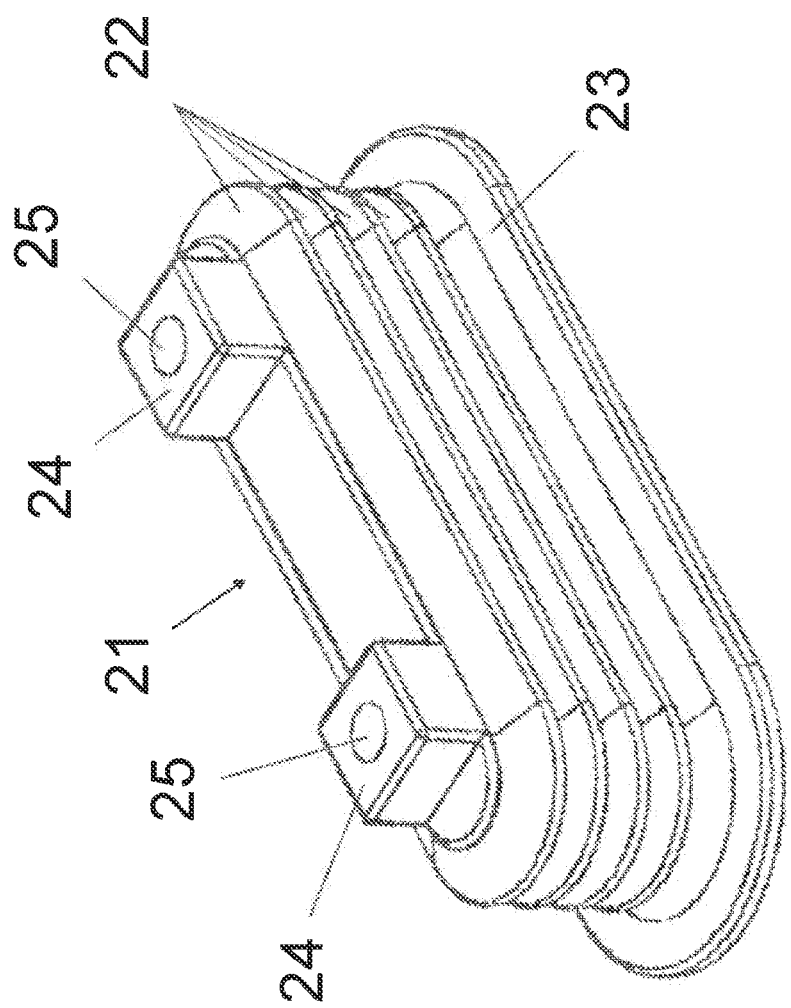
Figure 4:
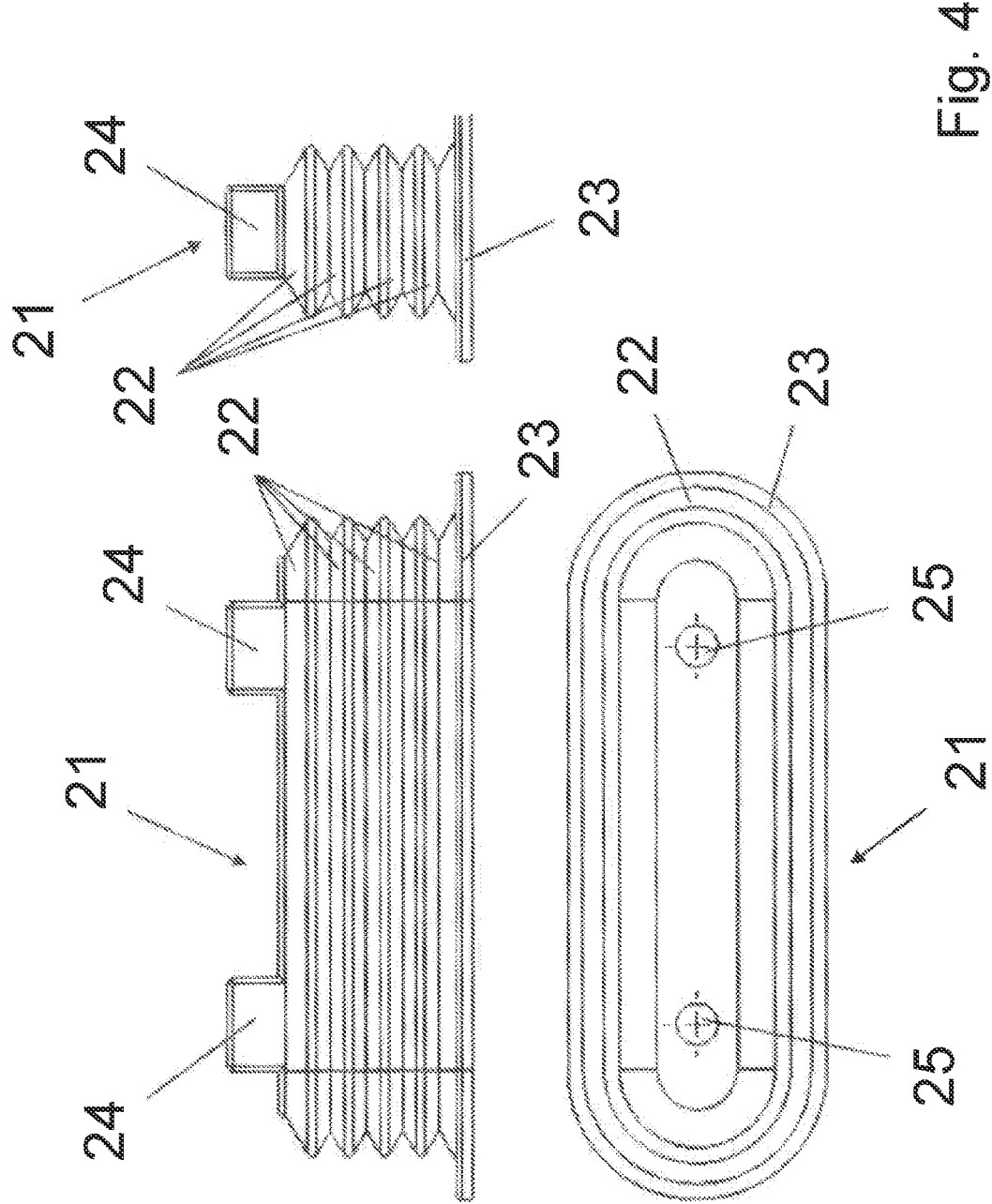
Figure 5:
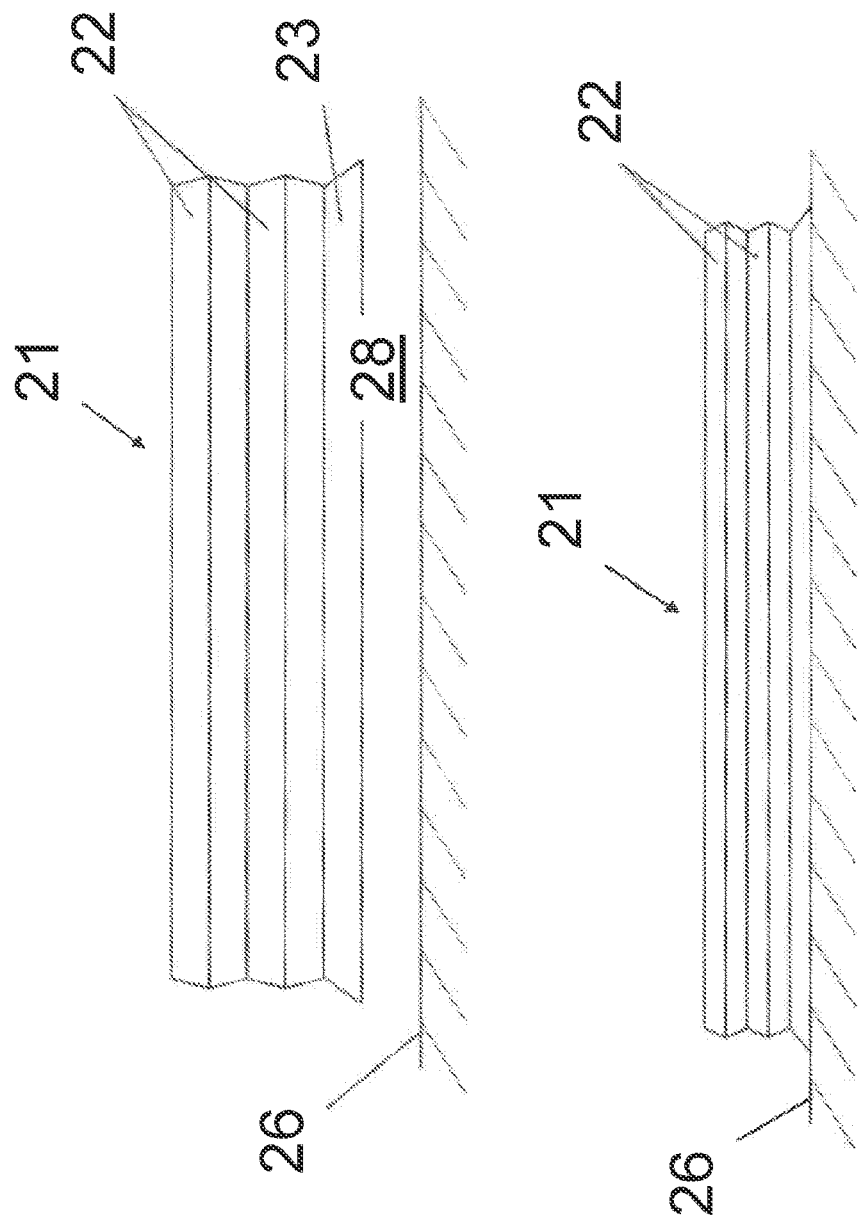
Figure 6:
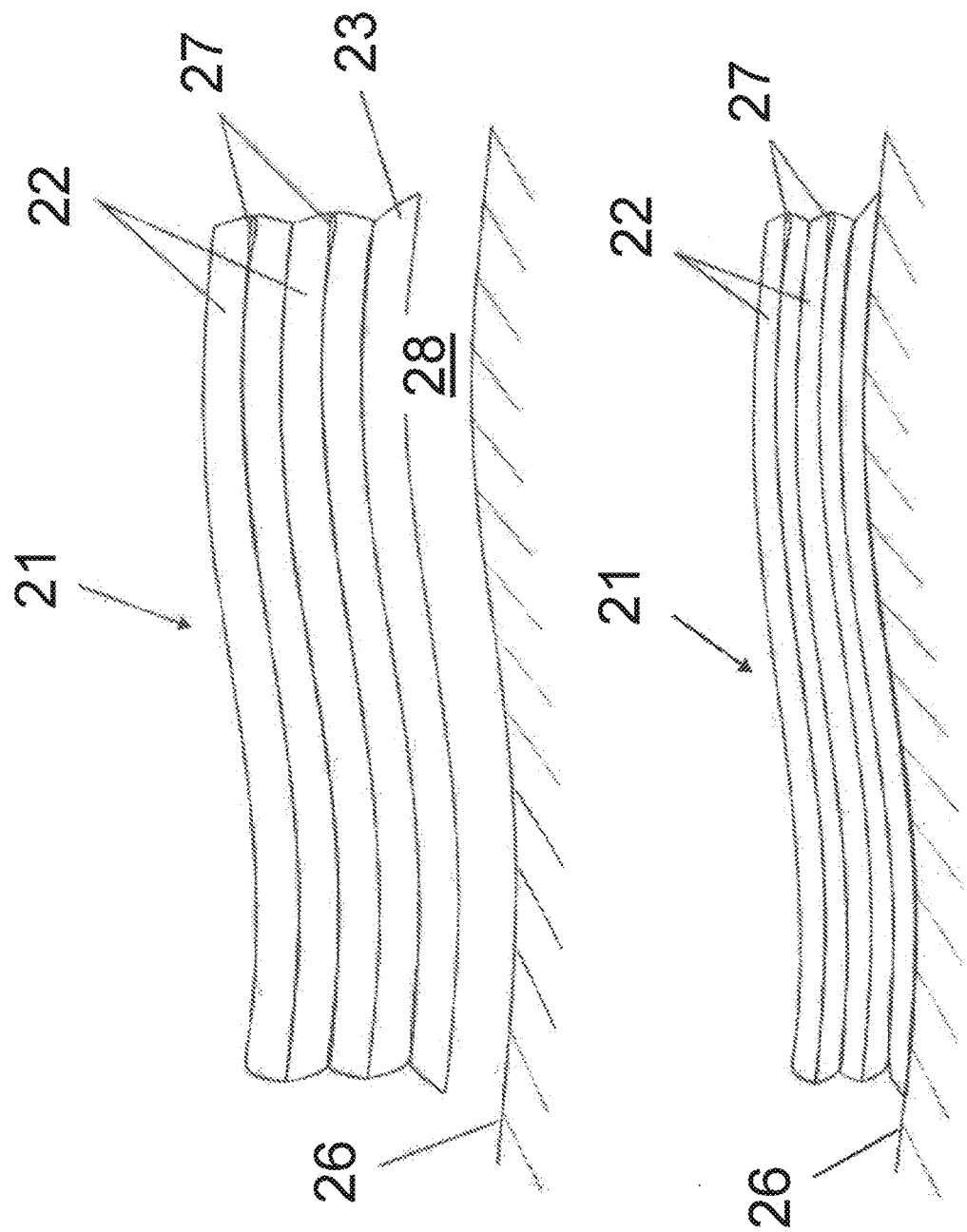
Figure 7:
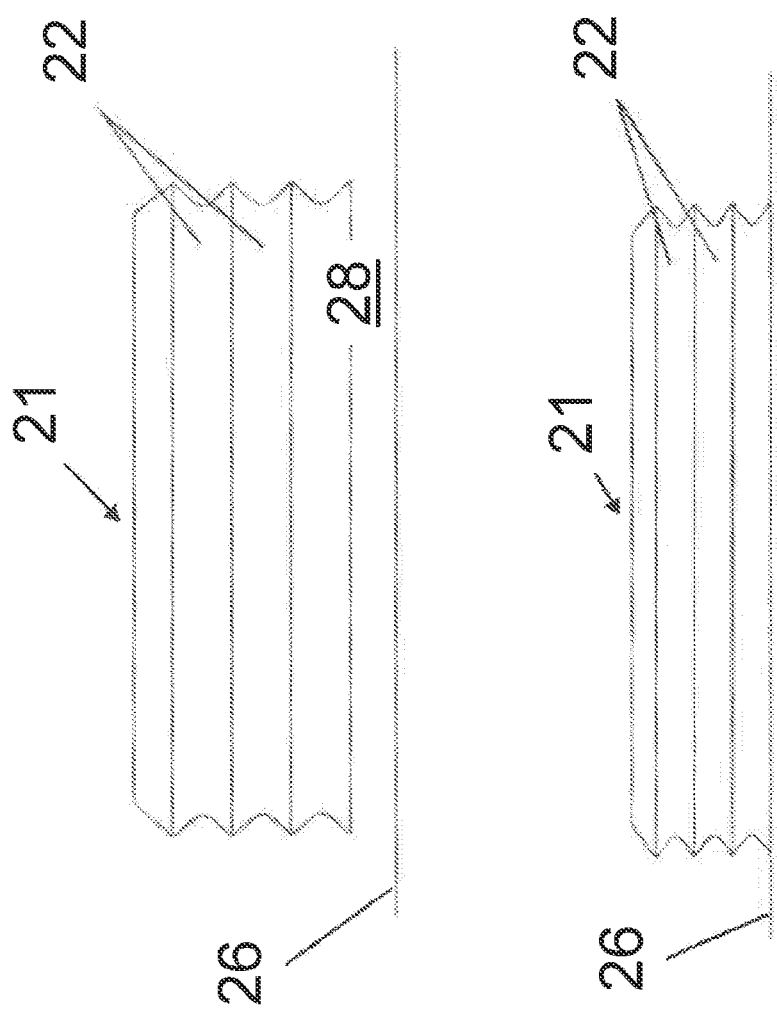
Figure 8:
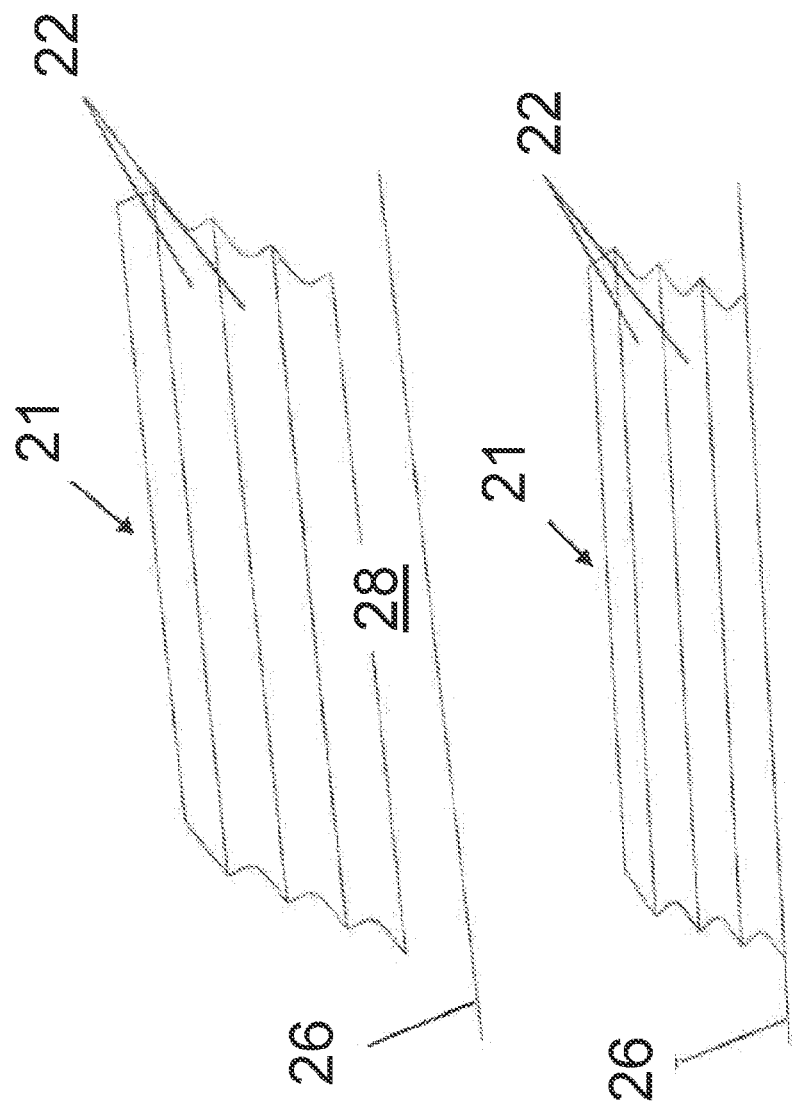

FIG. 1—shows a partial sectional view of a jet device according to the invention, FIG. 2—is a schematic representation of a cleaning arrangement with the jet device according to FIG. 1, FIG. 3—shows a schematic, isometric representation of a cooling head as an optional part of the device according to the invention with an elastic, bellows-like basic structure and connections for the supply of a coolant into the interior of the cooling head, FIG. 4—shows the cooling head according to FIG. 3 in three plane views, FIG. 5—shows a first application of the cooling head according to FIG. 3 on a plane adhesive surface for cooling the adhesive as part of a separation of the adhesive joint partners before and after placing the cooling head on the adhesive joint partners in the undeformed state and in the compressed state, FIG. 6—shows a further application of the cooling head according to FIG. 3 with blow-out openings arranged on the bellows-like lamellae and a curved contact surface on the adhesive joint partners, and FIG. 7 to 9—applications of a straight-shaped cooling head according to FIG. 3 on a flat adhesive surface (FIG. 7), a sloping-shaped cooling head on a sloping adhesive surface (FIG. 8) and a rounded-shaped cooling head on a rounded adhesive surface (FIG. 9)

DETAILED DESCRIPTION OF THE PREFERRED EMBODIMENTS

FIG. 1 shows a partial sectional representation of a jet device according to the invention. The jet device according to the invention comprises as essential components a tubular base body 1, a housing body 5, which surrounds the outer surface of the base body 1 in sections and provides an outlet opening 18, a feed unit 9 for the liquid carbon dioxide and a first dosing unit 4, via which the feed unit 9 is connected to the base body 1. Also provided are a second dosing unit 12 for the cold-resistant liquid and a line section 11 associated with the second dosing unit 12 for the cold-resistant liquid.

The first dosing unit 4 and the base body 1 of the jet device together provide an expansion chamber 2 which is formed in sections by a first line section 3 which has a cylindrical, convergent and/or divergent cross section.

In the expansion chamber 2, the liquid carbon dioxide expands and gaseous carbon dioxide and carbon dioxide particles are formed. The carbon dioxide mixture passes through the first line section 3 to the housing body 5 of the jet device and leaves it through the outlet opening 18 formed on the housing body 5.

The second line section 11, which is used to supply the cold-resistant liquid, opens into the divergently shaped part of the first line section 3. The cold-resistant liquid is therefore added to the carbon dioxide mixture shortly before it exits the jet device.

The quantity of the cold-resistant liquid can be set via the second metering unit 12 if it is not already contained in the liquid gas. In particular, the second dosing unit 12 can be designed in such a way that a cross section is completely blocked and the addition of the cold-resistant liquid is dispensed with.

An annular gap 14 is formed between the base body 1 and the housing body 5 of the jet device. Bores 6 provided on the housing body 5 are assigned to the annular gap 14 distributed in the circumferential direction. Ambient air can either be sucked in via the bores 6 or another propellant gas, for example compressed air, can be added. By supplying the ambient air, the jet geometry of the exiting jet can be influenced and excessive cooling of the housing body 1 can be counteracted. The supply of the propellant gas can also affect the geometry of the jet and counteract a cooling of the housing body 1. In addition, the emerging jet can be accelerated by the propellant gas, with the result that the cleaning effect is improved once again.

In the present case, the jet device provides a plastic jacket 10 on the base body 1, which is used for thermal insulation. Alternatively, for example, vacuum insulation can be provided.

FIG. 2 shows a schematic representation of a cleaning arrangement with the jet device according to FIG. 1. Here, a carbon dioxide tank 16 is connected to a supply hose 7 of the supply unit 9, via which the liquid carbon dioxide is made available. The supply hose 7 is connected to the first dosing unit 4 of the jet device via a screw connection 8.

Instead of the carbon dioxide tank 16, for example, a riser tube bottle or a bundle of bottles can be provided for storing the carbon dioxide.

Furthermore, a pressure bottle 17 in which the cold-resistant liquid is provided is connected to the second dosing unit 12 via a supply line 15. Instead of the pressure bottle 17, for example, a tank with a pump for the cold-resistant liquid can be provided.

To clean a surface that is not shown and to remove adhesive residues, a valve of the first dosing unit 4 is usually completely closed first. A valve of the second dosing unit 12 is also completely closed. A closure (not shown) of the $CO_2$ tank 16 is then opened. The first dosing unit 4 is then set in such a way that the desired ratio of gaseous carbon dioxide and carbon dioxide particles is provided. Typically, the adjustment will be such that about 40 to 60% solid carbon dioxide particles are provided and that 250 to 350 litres of gaseous carbon dioxide are produced from one kilogram of liquid carbon dioxide. Furthermore, by opening the second dosing unit 12, the cold-resistant liquid can then be added to the carbon dioxide mixture.

A cooling head 26 may be provided as part of the apparatus of the present invention. FIGS. 3 and 4 show schematically a cooling head formed here by way of example from segments 22 in the form of bellows, which is used for local cooling of at least sections 28 of the adhesively joined partners 26 to be separated, so that these adhesively joined partners 26 can be separated from one another with lower mechanical forces. For this purpose, by the effect of the coolant, which is conducted from a coolant reservoir (not shown) by means of fluid-tight connections to connections 25 in connection pieces 24 on the cooling head 21 and from there into the hood-like interior of the cooling head 21, which is surrounded by the cooling head 21, the adhesively joined partners 26 and the adhesive between the adhesively joined surfaces is thus cooled in such a way that the glass transition temperature of the adhesive is undershot. In this cooled state, the strength of the adhesive connection below the cooling head 21 is significantly reduced to such an extent that the adhesive connection is destroyed even by small, for example sudden, loads on the adhesively joined partners 26 and the adhesive joint partners 26 can be detached from one another at least locally.

In order to be able to carry out this cooling with the least possible loss of coolant, the coolant is fed into the interior of the cooling head 21 and the solid particles of the carbon dioxide typically change into the gaseous state, whereupon a large amount of cold is released inside of the cooling head 21 and acts on the adhesively joined partners 26 arranged on the cooling head 21 and the section 28 of the adhesive layer. As a result, the adhesive between the adhesively joined partners 26 becomes brittle and the adhesively joined partners 26 can be separated from one another much more easily, for example by means of hammer blows or other mechanical effects. If the adhesively joined areas of the adhesively joined partners 26 are larger than the dimensions of the contact surfaces 23 of the cooling head 21, the cooling head 21 can be displaced or repositioned relative to the adhesively joined partners 26 and the process of cooling and separating is repeated and the entire bonded connection between the adhesively joined partners 26 are gradually separated. Due to the brittle fracture behavior of the adhesive in the cooled state, a material-friendly removal is made possible, since the joint partners 26 are not damaged. A repair bond or rebonding is thus made possible.

With the device according to the invention, it is possible to partially cool adhesive connections within a few seconds to a temperature below −70° C. and to separate them manually with little effort. For this purpose, an advantageously flexible cooling head 12 in the basic form of a bellows 22 is used, which is made, for example, from elastomeric materials that have brittle properties below their glass transition temperature, and for example can be made from silicone rubber and/or styrene-butadiene rubber and/or polybutadiene or the materials TPU or TPE. This also makes it possible to deep-freeze curved geometries. The cooling head 21 can, for example, be attached to ferromagnetic, adhesively joined partners 26 by means of attached magnets or pressed by the worker using a thermally decoupled handle (not shown here) to the region 28 of the adhesively joined partners 26 to be cooled. The carbon dioxide $CO_2$ or nitrogen emerging from the coolant reservoir fills the cooling head 21 and thus carries out a cooling of the contact surface 28 under the cooling head 21. The temperature in the cooling head 21 can be monitored in an integrated manner via a thermocouple (not shown). One or more vent openings 27 can be provided on the cooling head 21 for pressure equalization.

As an addition, it is also possible to digitally record the area 28 of the adhesively joined partners 26 to be removed via a scanning process and to generate one or more individual cooling heads 21 from the resulting 3D model using an additive manufacturing process, for example. Likewise, the force required for separating can be applied by a suitable mechanical or motorized mechanism (chisel or similar).

A further possibility for designing the cooling head 21 would be the use of metallic materials which are constructed in the form of a bellows 22 or analogous to corrugated pipes or flexible hoses.

With the invention, industrial as well as repair shops, especially in the automotive sector, can dismantle and/or clean adhesive joints as required with very little effort. This results in both monetary (reduction in working hours) and ergonomic (less physical stress on the worker) advantages. In addition, the invention can be used wherever adhesive bonds have to be removed, in particular non-destructively, for example in the railway industry, the aircraft industry, mechanical engineering, electronics and the plastics industry: The adhesive connection of components has meanwhile gained immense importance. Particularly suitable adhesives are cross-linked adhesives, which react to cold exposure with embrittlement and/or hardening, for example epoxy resins, polyurethane adhesives and/or acrylate adhesives.

A simple adaptation of the shape of the cooling head 21 is also advantageous, in which, for example, the bellows-like sections 22 of the cooling head 21 and/or the contact surface 23 of the cooling head 21 on the adhesively joined partners 26 and the sealing elements present there are made of an elastic material that adapts elastically to the shape of the sections 28 to be separated of the adhesively joined partners 26. For example, elastically deformable materials such as TPU, TPE or other elastomeric materials can be used for this. It is advantageous here if these materials themselves have glass transition temperatures below which they reversibly lose their elasticity and exhibit brittle properties. This can be used to also temporarily harden these materials under the influence of the coolant, which is introduced into the cooling head 21 anyway to embrittle the adhesives of the adhesive joint, and thus retain their geometry achieved by pressing against the shape of the adhesively joined partners 26. As a result, the deformed state of the bellows-like sections 22 of the cooling head 21, as can be seen, for example, in FIG. 6 can be retained and the cooling head 21 no longer has to be pressed against the adhesively joined partners 26 against the elasticity of the bellows-like sections 22 of the cooling head 21. As a result, on the one hand, the worker is relieved when operating the cooling head 21 and the sealing effect between the cooling head 21 and the adhesively joined partners 26 is improved.

Furthermore, as can be seen in FIGS. 7 to 9, the basic shape of the cooling head 21 can be adapted to the shape of the adhesively joined partners 26 in the region 28 of the adhesively joined surfaces to be separated, for example by placing an inclined cooling head 21 on an inclined bonding surface 26 (FIG. 8) or a rounded cooling head 21 is adapted to a rounded adhesive surface 26 (FIG. 9). As a result, in addition to the elastic properties of the cooling head 21, adhesively joined surfaces with a complex shape can also be reliably covered by the correspondingly shaped cooling head 21 and separated more easily by cooling. Due to the bellows-like design 22 of the cooling head 21, as can be seen from the before and after comparison of FIGS. 5 to 9, the cooling head 21 is compressed when it is placed on the adhesively joined partners 26 and the elastic sealing effect on the coolant is improved. This also reduces the coolant volume required within the cooling head 21, and so overall less coolant is required overall.

Identical components and component functions are identified by the same reference symbols.

REFERENCE LIST

1—base body
2—expansion chamber
3—line section
4—dosing unit
5—housing body
6—bores
7—supply hose
8—screw connection
9—feed unit
10—plastic jacket
11—line section
12—dosing unit
14—annular gap
15—supply line
16—carbon dioxide tank
17—pressure bottle
18—outlet opening
21—cooling head
22—elastically deformable sections/bellows
23—contact surface on adhesively joined connection
24—connection piece
25—valve
26—adhesively joined partners
27—opening
28—area of the adhesive joint covered by the cooling head

The invention claimed is:

1. A method for embrittling an adhesive surface of a first part for the purpose of separating the adhesive surface from a second part, the method comprising:
   guiding liquid carbon dioxide from a supply through a first dosing unit and then passing the liquid carbon dioxide into a jet device and into an expansion chamber of the jet device,
   supplying a cold-resistant liquid to a mixture of gaseous carbon dioxide and carbon dioxide particles produced in the expansion chamber and mixing the cold-resistance liquid with the mixture of the gaseous carbon dioxide and the carbon dioxide particles to form a coolant mixture,
   ejecting the coolant mixture from the jet device as a coolant via an outlet opening of the jet device,
   directing the coolant mixture towards the first and/or second parts and/or towards an adhesive connection between the first and second parts to embrittle the adhesive connection by lowering a temperature of the adhesive connection to −40° C. or lower so that a mechanical separation of the parts is possible, and
   separating the parts mechanically.

2. The method according to claim 1, wherein the parts are mechanically separated by a spatula.

3. The method according to claim 1, wherein the cold-resistance liquid is selected from the group consisting of ethanol, isopropanol, and a liquid comprising ethanol and isopropanol as a main component thereof.

4. A method for embrittling an adhesive surface of a first part for the purpose of separating the adhesive surface from a second art, the method comprising:
   guiding liquid carbon dioxide from a supply through a first dosing unit and then passing the liquid carbon dioxide into a jet device and into an expansion chamber of the jet device,
   supplying a cold-resistant liquid to a mixture of gaseous carbon dioxide and carbon dioxide particles produced in the expansion chamber and mixing the cold-resistance liquid with the mixture of the gaseous carbon dioxide and the carbon dioxide particles to form a coolant mixture, and
   ejecting the coolant mixture from the jet device as a coolant via an outlet opening of the jet device,
   providing an adhesive connection between the first and second parts, wherein the adhesive connection is to be separated,
   covering a section of the adhesive connection with a cooling head,
   introducing the coolant mixture between the cooling head and the section of the adhesive connection covered by the cooling head.

5. The method according to claim 4, further comprising:
   pressing the cooling head against an area of the adhesive connection to be separated to largely seal off a coolant volume enclosed by the cooling head and the adhesive connection, wherein a material of the cooling head adapts elastically to a shape of the area of the adhesive connection, and
   wherein the material of the cooling head becomes less elastic upon introducing the coolant mixture between the cooling head and the adhesive connection.

6. The method according to claim 4, further comprising:
   cooling the adhesive connection by moving the cooling head along the adhesive connection.

7. The method according to claim 4, wherein introducing the coolant mixture seals spaces between contact areas of the cooling head and the adhesive connection by an effect of escaping coolant mixture.

8. A method of embrittling an adhesive surface of a first part for the purpose of separating the adhesive surface from a second part, the method comprising:
   providing a jet device, the jet device comprising:
      a supply unit for liquid carbon dioxide,
      a first dosing unit for the liquid carbon dioxide,
      an expansion chamber,
      an outlet opening,
      a first line section ending at the outlet opening, wherein the first line section is a part of the expansion chamber,
      a second dosing unit for a cold-resistant liquid,
      a second line section, and
      a connection between the second line section and the expansion chamber for supplying the cold-resistance liquid to the expansion chamber, passing liquid carbon dioxide from the supply unit through the first dosing unit and then into the expansion chamber, passing the cold-resistant liquid through the second dosing unit, the second line section and the connection to a mixture of gaseous carbon dioxide and carbon dioxide particles produced in the expansion chamber and mixing the cold-resistant liquid with the mixture of the gaseous carbon dioxide and the carbon dioxide particles to form a coolant mixture, electing the coolant mixture from the jet device as a coolant via the outlet opening of the jet device, and directing the coolant mixture towards the first and/or second parts and/or towards an adhesive connection between the first and second parts to embrittle the adhesive connection by lowering a temperature of the adhesive connection to −40° C. or lower so that a mechanical separation of the parts is possible.

\* \* \* \* \*

UNITED STATES PATENT AND TRADEMARK OFFICE
CERTIFICATE OF CORRECTION

PATENT NO. : 12,479,012 B2  
APPLICATION NO. : 18/011874  
DATED : November 25, 2025  
INVENTOR(S) : Michael Wibbeke et al.

Page 1 of 1

It is certified that error appears in the above-identified patent and that said Letters Patent is hereby corrected as shown below:

In the Claims

In Claim 4, Line 3 (Column 12, Line 12): change "art" to --part--

In Claim 8, Line 27 (Column 13, Line 11): change "electing" to --ejecting--

Signed and Sealed this  
Twenty-third Day of December, 2025

John A. Squires  
*Director of the United States Patent and Trademark Office*